US010547387B2

(12) United States Patent
Vegas-Olmos et al.

(10) Patent No.: US 10,547,387 B2
(45) Date of Patent: Jan. 28, 2020

(54) TRANSITION BASED FEEDFORWARD EQUALIZATION METHOD AND APPARATUS IMPLEMENTED WITH LOOKUP TABLE CIRCUITS

(71) Applicant: Mellanox Technologies Denmark ApS., Roskilde (DK)

(72) Inventors: Juan Jose Vegas-Olmos, Søborg (DK); Steen Christensen, Roskilde (DK); Johan Jacob Mohr, Copenhagen (DK)

(73) Assignee: MELLANOX TECHNOLOGIES DENMARK APS., Roskilde (DK)

(*) Notice: Subject to any disclaimer, the term of this patent is extended or adjusted under 35 U.S.C. 154(b) by 29 days.

(21) Appl. No.: 15/942,043

(22) Filed: Mar. 30, 2018

(65) Prior Publication Data
US 2019/0305851 A1 Oct. 3, 2019

(51) Int. Cl.
H04B 10/50 (2013.01)
H04B 10/588 (2013.01)
H04B 10/54 (2013.01)
G11B 5/09 (2006.01)

(52) U.S. Cl.
CPC ......... *H04B 10/50593* (2013.01); *G11B 5/09* (2013.01); *H04B 10/541* (2013.01); *H04B 10/588* (2013.01)

(58) Field of Classification Search
CPC ..... G11B 5/09; G11B 20/10009; G11B 20/18; G11B 11/10595; G11B 2220/2516; G11B 5/455; G11B 20/10037
USPC .......................................... 375/233; 398/115
See application file for complete search history.

(56) References Cited

U.S. PATENT DOCUMENTS

| | | | | |
|---|---|---|---|---|
| 2013/0142244 A1* | 6/2013 | Tan | .................... | H04L 25/03012 375/232 |
| 2016/0006596 A1* | 1/2016 | Dickson | ................ | H04L 27/364 375/298 |
| 2016/0149730 A1* | 5/2016 | Navid | ................ | H04L 25/03343 375/233 |
| 2017/0187463 A1* | 6/2017 | Nedovic | .............. | H04B 10/503 |

* cited by examiner

*Primary Examiner* — David C Payne
*Assistant Examiner* — Sarah Hassan
(74) *Attorney, Agent, or Firm* — Alston & Bird LLP

(57) ABSTRACT

Embodiments are disclosed for equalizing input signals for communication systems. An example method includes receiving an input signal. The input signal encodes a plurality of bits in a number of amplitude levels. The example method further includes converting the input signal to an equalized output signal using a plurality of lookup table circuits. The equalized output signal encodes a plurality of symbols in a number of amplitude levels. The example method further includes feeding the equalized output signal to an output driver circuit.

14 Claims, 7 Drawing Sheets

TRANSITION BASED FEEDFORWARD EQUALIZATION METHOD AND APPARATUS IMPLEMENTED WITH LOOKUP TABLE CIRCUITS

TECHNOLOGICAL FIELD

Embodiments of the present invention relate generally to a transition based feedforward equalization method and apparatus in optical and electrical communication systems.

BACKGROUND

The present invention relates to a transition based feedforward equalization method and apparatus implemented with lookup table circuits to equalize pulse amplitude modulation ("PAM") signals. Communication systems are generally composed of a transmitter, a receiver, and a channel. The transmitter generates a signal conveying information, which, after being transmitted over a channel, is received and recovered at the receiver. For optical based communications such as communications using vertical cavity surface emitting lasers (VCSELs), electro-absorption modulated lasers (EMLs), or directly modulated lasers (DMLs), the lasers are non-linear laser sources. In addition, the channel and the receiver may induce distortions on the signal due to linear and/or non-linear phenomena. The present invention presents a method and apparatus to implement a feedforward equalization to compensate for these impairments in linear and/or non-linear drivers and channels.

BRIEF SUMMARY

Example embodiments described herein disclose a transition based feedforward equalization method and apparatus. The details of some embodiments of the subject matter described in this specification are set forth in the accompanying drawings and the description below. Other features, aspects, and advantages of the subject matter will become apparent from the description, the drawings, and the claims.

In accordance with an example embodiment, a feedforward equalization method for equalizing input signals for communication systems is provided. The method includes receiving an input signal. The input signal encodes a plurality of bits in a number of amplitude levels. The method further includes converting the input signal to an equalized output signal using a plurality of lookup table circuits. The equalized output signal encodes a plurality of symbols in a number of amplitude levels. The method further includes feeding the equalized output signal to an output driver circuit.

In some embodiments, the equalized output signal is a pulse amplitude modulation signal encoding the plurality of symbols in four amplitude levels.

In some embodiments, the input signal is generated by subsampling a full-rate signal.

In some embodiments, the input signal represents a low-rate flows portion of the full-rate signal.

In some embodiments, the plurality of bits in the input signal represent a plurality of transition levels of a pulse amplitude modulation signal, and wherein bits in the plurality of bits in the input signal corresponding to different transition levels of the plurality of transition levels are converted independently.

In some embodiments, converting the input signal to the equalized output signal further comprises using a plurality of multiplexers to multiplex a plurality of outputs of the lookup table circuits.

In some embodiments, converting the input signal to the equalized output signal further comprises using a plurality of variable gain amplifiers to amplify a plurality of outputs of the multiplexers.

In some embodiments, the plurality of bits in the input signal comprises a plurality of fixed tap bits and a plurality of floating tap bits. And converting the input signal to the equalized output signal further includes: using a plurality of selector circuits to select a plurality of bits from the plurality of floating tap bits; using a plurality of floating tap bits processing lookup table circuits from the plurality of lookup table circuits to convert the selected floating tap bits; and using a plurality of fixed tap bits processing lookup table circuits to convert the plurality of fixed tap bits.

In some embodiments, an output source associated with the output driver circuit is a vertical cavity surface emitting laser.

In some embodiments, the lookup table circuits are configured to overcome an eye-compression and an eye-closure of an eye diagram of an output generated by an output source associated with the output driver circuit.

In accordance with another example embodiment, a transmitter-side feedforward equalizer used in communication systems is provided. The transmitter-side equalizer is configured to: receive an input signal, wherein the input signal encodes a plurality of bits in a number of amplitude levels; convert the input signal to an equalized output signal using a plurality of lookup table circuits, wherein the equalized output signal encodes a plurality of symbols in a number of amplitude levels; and feed the equalized output signal to an output driver circuit.

In some embodiments, the apparatus is further configured to convert the input signal to the equalized output signal by using a plurality of multiplexers to multiplex a plurality of outputs of the lookup table circuits.

In some embodiments, the apparatus is further configured to convert the input signal to the equalized output signal by using a plurality of variable gain amplifiers to amplify a plurality of outputs of the multiplexers.

In some embodiments, the plurality of bits in the input signal comprises a plurality of fixed tap bits and a plurality of floating tap bits, and the apparatus is further configured to convert the input signal to the equalized output signal by: using a plurality of selector circuits to select a plurality of bits from the plurality of floating tap bits; using a plurality of floating tap bits processing lookup table circuits from the plurality of lookup table circuits to convert the selected floating tap bits; and using a plurality of fixed tap bits processing lookup table circuits to convert the plurality of fixed tap bits.

The above summary is provided merely for purposes of summarizing some example embodiments to provide a basic understanding of some aspects of the present invention. Accordingly, it will be appreciated that the above-described embodiments are merely examples and should not be construed to narrow the scope or spirit of the present invention in any way. It will be appreciated that the scope of the present invention encompasses many potential embodiments in addition to those here summarized, some of which will be further described below.

BRIEF DESCRIPTION OF THE DRAWINGS

Figure 2A:
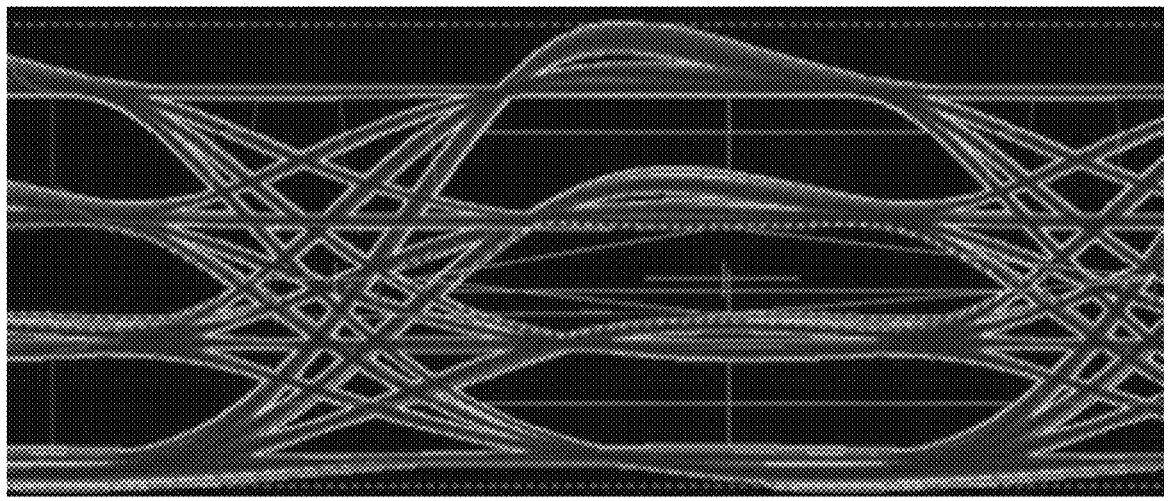
Figure 2B:
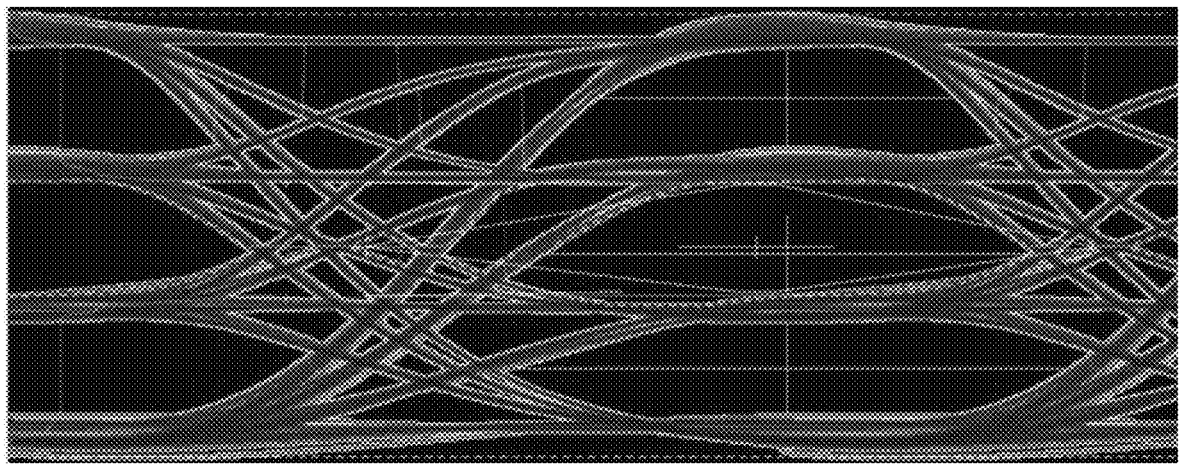
Figure 3:
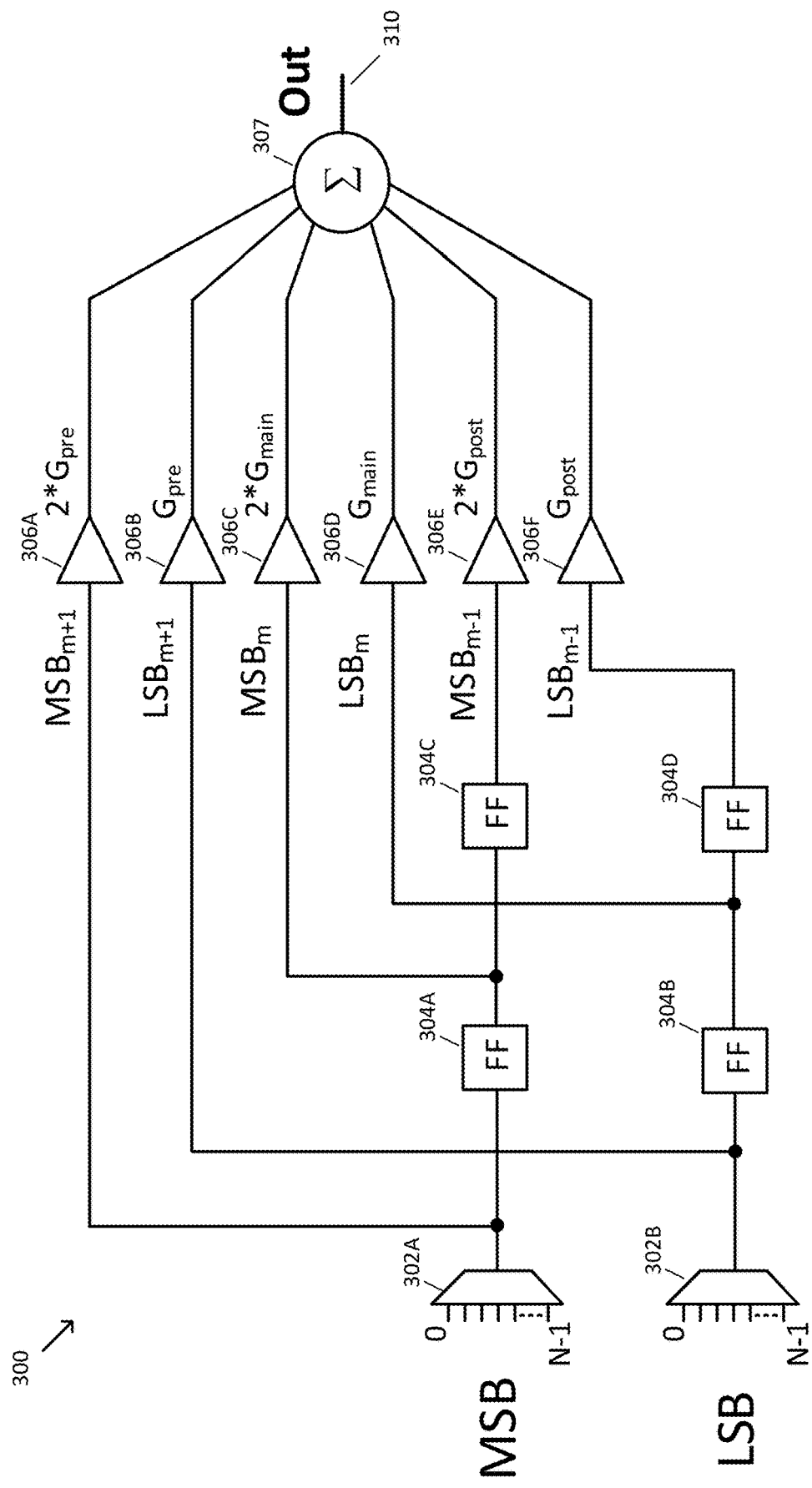
Figure 4:
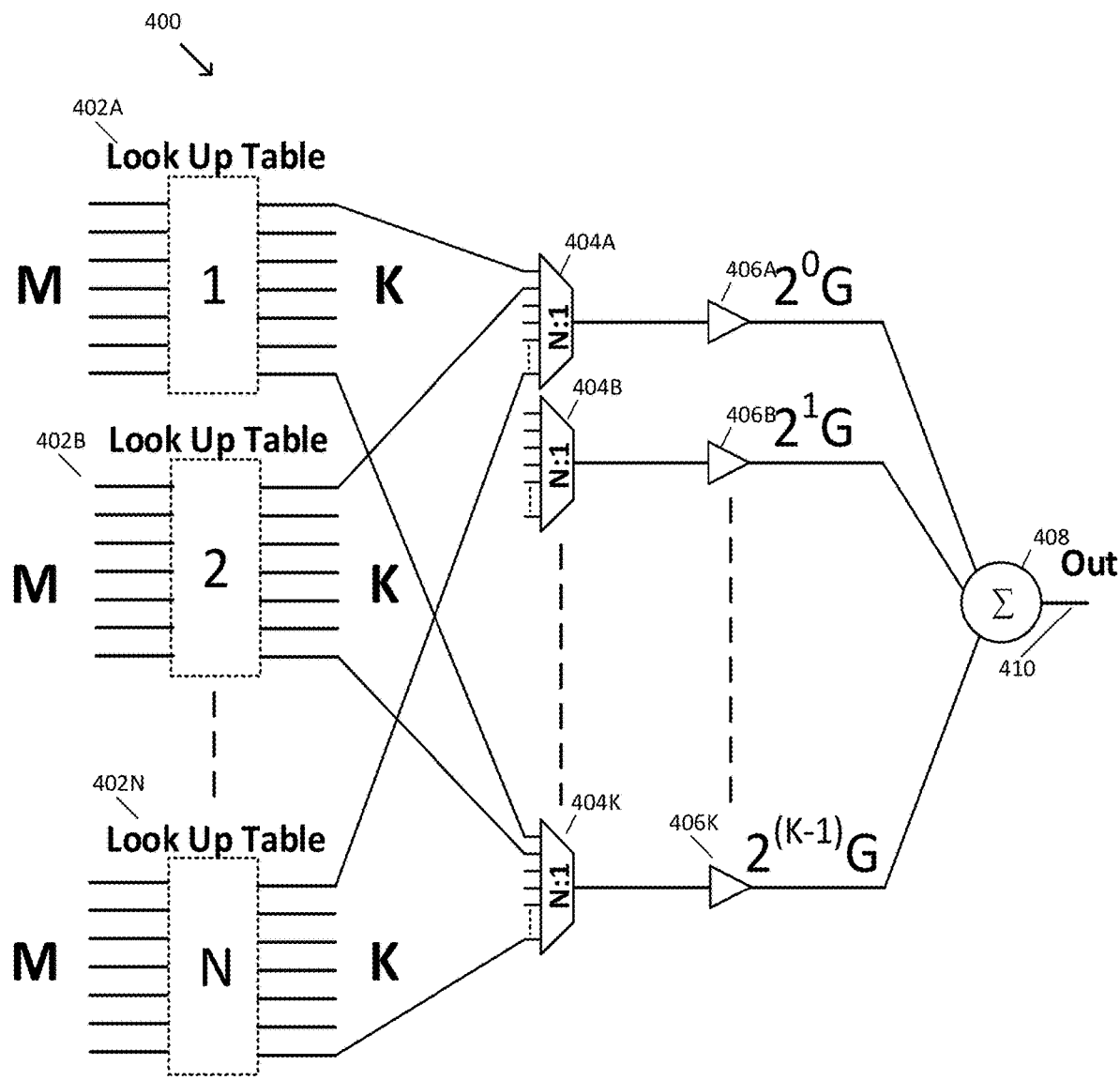
Figure 5:
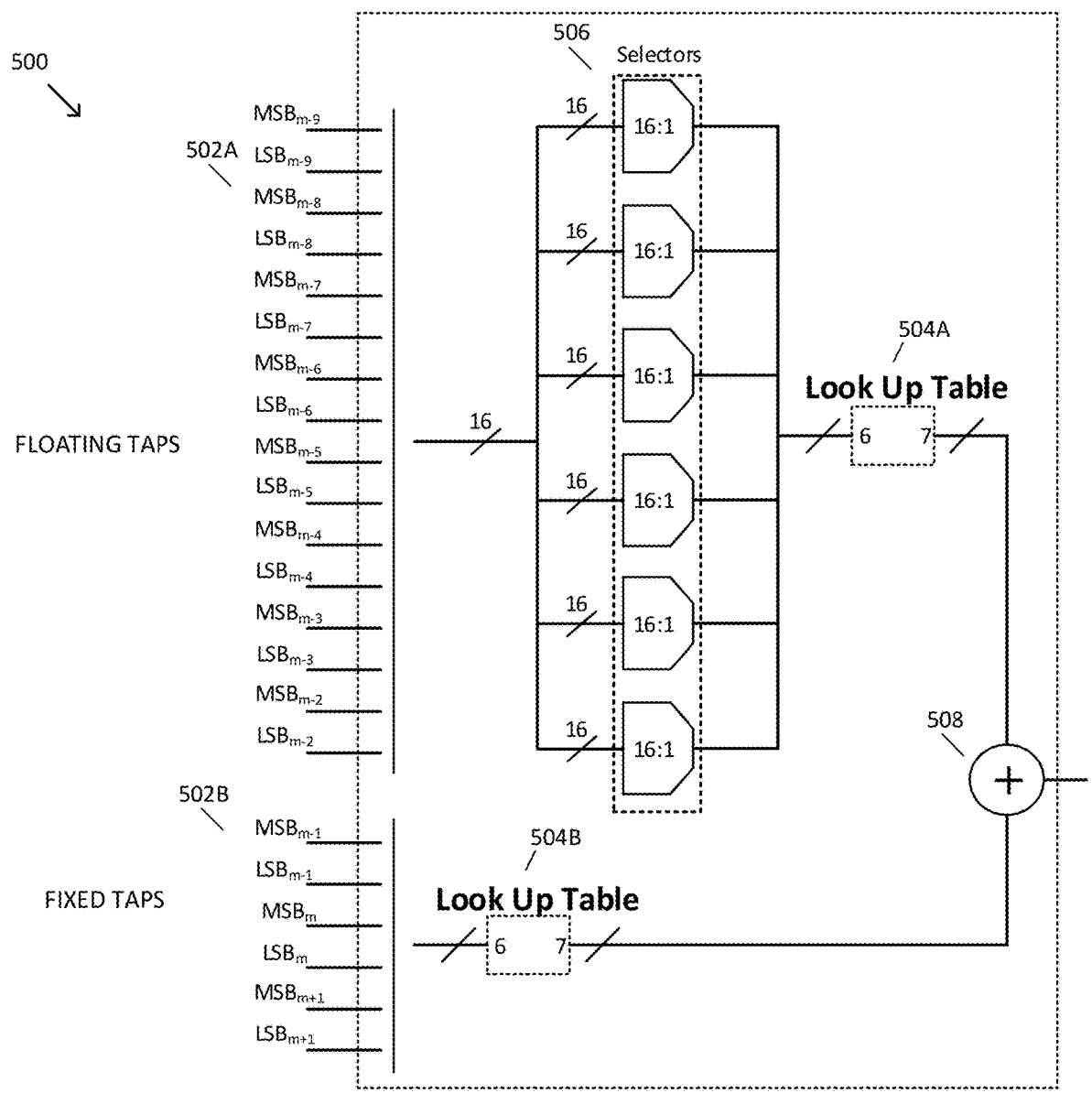
Figure 6:
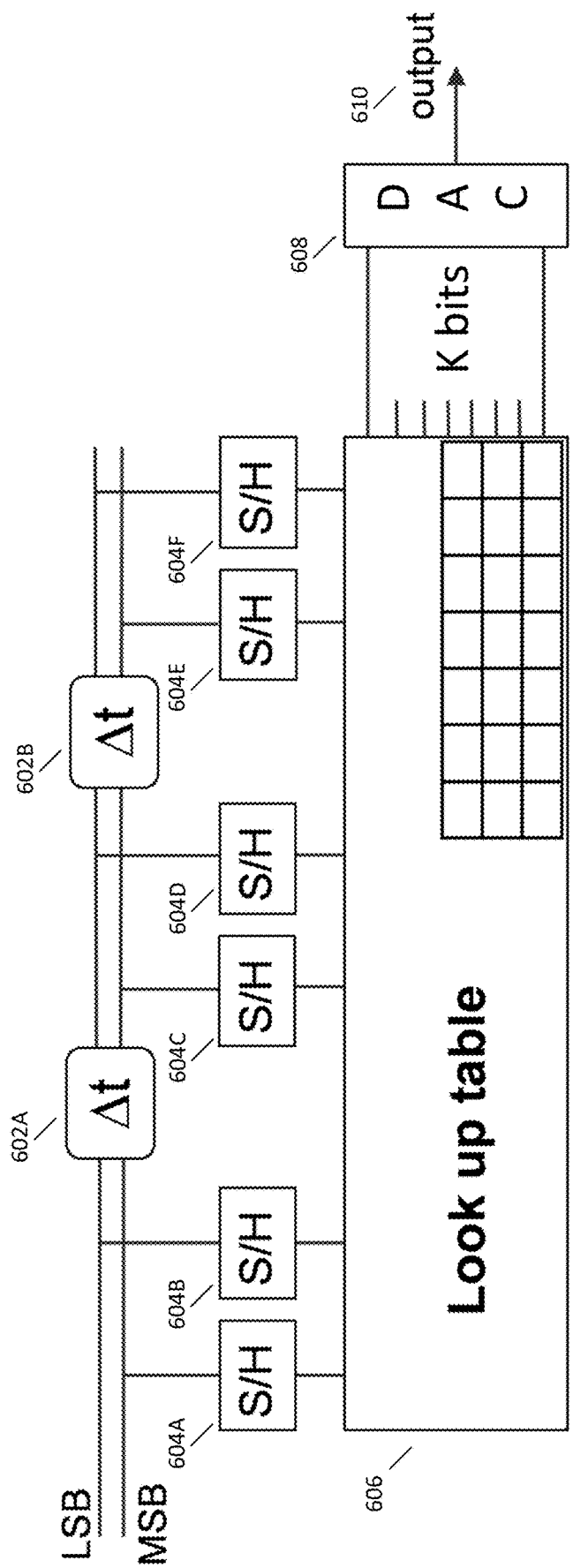
Figure 7:
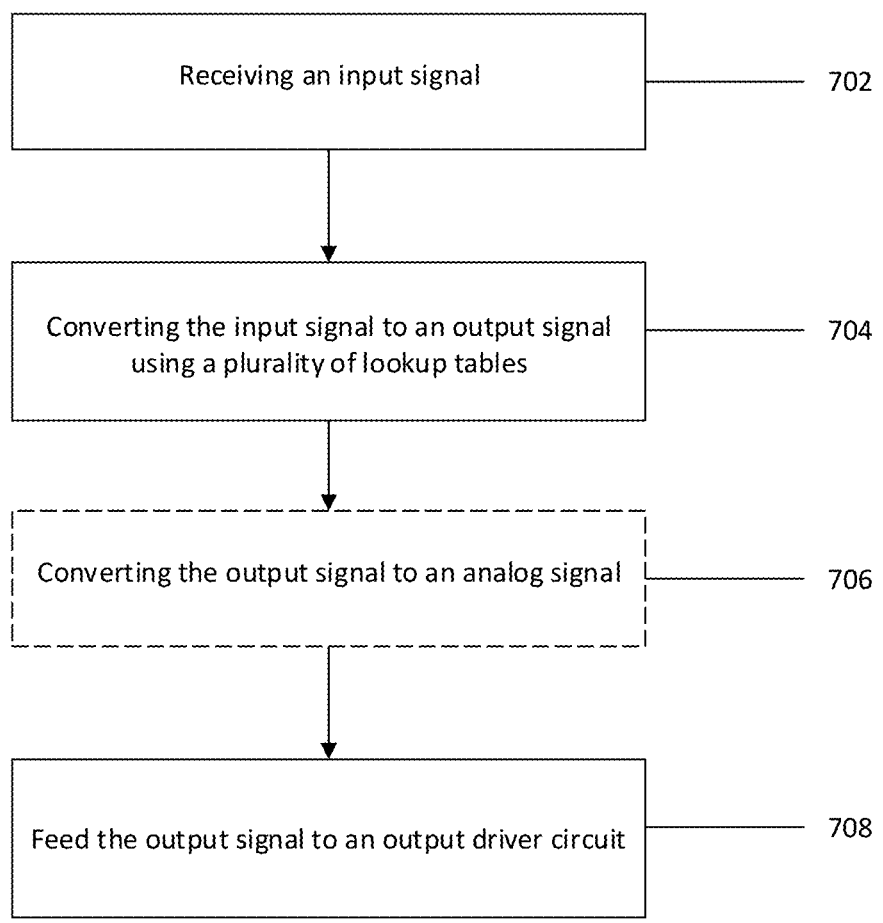

Having thus described the disclosure in general terms, reference will now be made to the accompanying drawings, which are not necessarily drawn to scale, and wherein:

FIGS. 1A to 1D illustrate data analysis of transition parameters for a VCSEL driven with regular implementations;

FIGS. 2A and 2B illustrate a comparison of eye diagrams of signals generated by a VCSEL driven with and without application of embodiments of the present invention;

FIG. 3 illustrates a block diagram of a traditional feedforward equalizer;

FIG. 4 illustrates a transition based feedforward equalizer that utilizes lookup table circuits according to example embodiments of the present invention;

FIG. 5 illustrates a block diagram of a lookup table circuit where fixed and floating taps of an input signal are processed separately according to example embodiments of the present invention;

FIG. 6 illustrates a block diagram of a digital approach to implement a transition based feedforward equalizer with lookup table circuits according to example embodiments of the present invention; and FIG. 7 is a flowchart illustrating an example method of operation of a transition based feedforward equalizer implemented with lookup table circuits according to example embodiments of the present invention.

DETAILED DESCRIPTION

Example embodiments will now be described more fully hereinafter with reference to the accompanying drawings, in which some, but not all, embodiments are shown. Indeed, the embodiments may take many different forms and should not be construed as limited to the embodiments set forth herein; rather, these embodiments are provided so that this disclosure will satisfy applicable legal requirements. Like reference numerals refer to like elements throughout. The terms "exemplary" and "example" as may be used herein, are not provided to convey any qualitative assessment, but instead merely to convey an illustration of an example. Thus, use of any such terms should not be taken to limit the spirit and scope of embodiments of the present invention.

Optical communication systems generally include a transmitter, a receiver, and a channel. The transmitter generates an optical signal conveying information, which, after being transmitted over a channel, is received and recovered at the receiver. In the real world, transmission channels are non-ideal and introduce various unwanted effects that cause distortion of the signals, making the communication less reliable. For example, the channel may have a transfer function that introduce changes in the signal transmitted in the form of amplitude and/or phase changes. These changes distort the signal received at the receiver. Moreover, during transmission, inter-symbol interference ("ISI") may occur. ISI is a form of distortion of a signal in which one symbol interferes with subsequent symbols. The presence of ISI makes the communication less reliable. In addition, the transmission channel may also distort the signal by attenuating higher frequencies more than lower frequencies. All of these unwanted effects distort the signal in the transmission process. Therefore, equalization is needed to overcome these unwanted effects and to accurately reconstruct the signal. One traditional approach for equalization is to use a feed-forward equalizer (FFE) at the transmitter.

Traditional FFE based equalization inverts the ISI induced in the channel by equalizing the transmitted signal with the inverse response of the channel. The FFE typically emphasizes the higher frequencies of the signal to counter the channel's low-pass nature. The channel response to be equalized provides a figure of merit on how many bits need to be equalized. The number of how many bits need to be equalized may be equal to the number of taps of the FFE. As long as the number of taps of the FFE is greater than the channel response, the signal can be fully equalized. However, increasing the number of taps in an FFE would require a more complicated system and increased power consumption. In high-speed circuits, typical FFEs have between 3 to 9 taps.

The design of a traditional FFE involves assessing the eye diagram of the signal to be equalized and obtaining the tap coefficients (gain factors) that maximize the eye opening. This is an effective approach if the channel and the laser source generating the optical signal are linear.

However, the optical signal is often generated by non-linear laser sources as emitting sources, such as vertical cavity surface emitting lasers (VCSELs). In this case, the output power has a nonlinear relation with the driving input signal. The output signal depends on the input signal and also on a plurality of other conditions (such as steady current output value). Therefore, when non-linear laser sources are used to encode information in different amplitude levels (such as pulse amplitude modulation-4), the transitions between amplitude levels are not linear. Traditional FFE based equalization are suboptimal for equalizing signals with such non-linearity because there are no mechanisms to address non-linearity. In addition, different output sources such as different VCSELs behave differently. Therefore, an equalization solution needs to be able to configurable to adjust to the specific VCSEL being driven. Such configurability is lacking in the traditional FFE based equalization solutions.

Advanced equalization schemes exist to handle such non-linearity. These solutions use information from more than one transmit symbol to control the amplitude at the input of the driver. However, these solutions rely on extensive digital signal processing (DSP) techniques, which result in high power consumptions and introduce latency in the process because of the extensive DSP techniques performed.

Embodiments of the present invention are provided that comprise a transition based equalization method and apparatus with lookup table circuits that address this non-linearity without the drawback of high power consumptions and latency associated with traditional advanced equalization schemes. Some embodiments of the present invention can also be applied to linear drivers and channels. Some embodiments of the present invention provide a reconfigurable solution that can be adjusted depending on the output being driven.

Embodiments of the present invention can also be implemented to handle eye compression due to low linearity of laser sources, such as EMLs, DMLs or external Mach-Zehnder Modulators (MZMs).

Embodiments of the present invention can also be implemented to handle the issue of reflections. Reflections are linear effects that can occur both in transmission line discontinuities and at the driver/connector electrical interfaces. These effects lead to a portion of the transmitted signal being reflected back and forth with a delay, thereby impacting current symbols. If the electrical distance between reflections is longer than about half the symbol length, the reflections may cause ISI, which in turn might degrade system performance.

One way to mitigate this degradation is to use a FFE embedded in a transmitter with a length corresponding to the (two-way) electric length to the reflection(s). The relevant lengths might be many tens of a symbol length. For example, 50 GB signaling on typical transmission lines means that 2 mm corresponds to symbol length (two-way), which is short compared to typical lengths of transmitter-to-driver/connector signal paths.

Often times, there are some dominant reflections. This means that a transition based feedforward equalizer with a reduced set of coefficients (taps) can be very effective. Since the exact distance to reflections is dependent on the transmitter and driver/connector assembly, each tap needs in distance with reference to the present symbol to be configurable. This is denoted as a floating tap transition based feedforward equalizer. Embodiments of the present invention thus provide example implementations of a floating tap transition based feedforward equalizer that enable a reconfigurable reflection canceling method to improve the signal performance in the transmission.

Figures 1A, 1B, 1C, 1D:
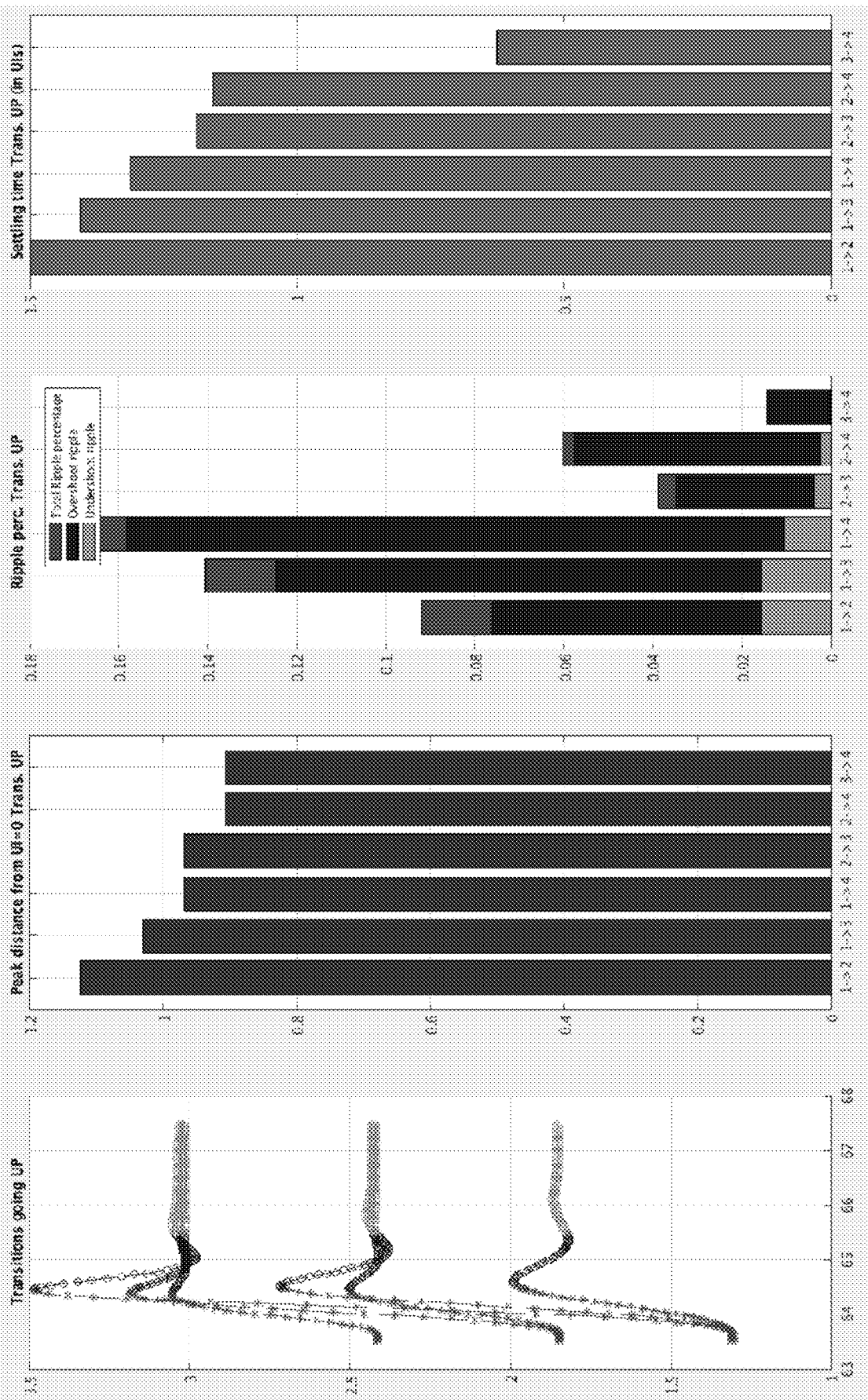

FIGS. 1A to 1D present data analysis of transition parameters for a VCSEL driven with regular implementations, which highlight the problem to be solved by example embodiments of the present invention. The metrics include peak distance in terms of unit interval (UI) from the beginning of the transition (overshooting peak distance), ripple percentage in terms of end level, and settling time in terms of UI to fall within 97% of the end level. As illustrated in FIG. 1A and FIG. 1C, transitions from level 1 to levels 2, 3, and 4 present a large ripple percentage. Moreover, the overshoot ripple as illustrated in FIG. 1C is very large. Therefore, ripples effectively occupy an eye diagram of a VCSEL signal. As a result, the bit error rate in this case would be relatively large.

To solve this ripple in transitions from level 1 to levels 2, 3 and 4, it is desirable to specifically equalize these three transitions. However, as illustrated, since the peak distance differs for each transition, the frequency response of each transition is different. Therefore, the equalization needs to be tailored for each transition, which are is easily achievable by prior art systems. Traditional FFE based equalization are not configurable to independently equalize each transition. Some advanced equalization schemes with complex digital signal processing techniques can specifically tailor each transition, but these complex digital signal processing techniques introduce undesirable latency and undesirably high power consumption to the system.

FIGS. 2A and 2B illustrate a comparison of eye diagrams of signals generated by a VCSEL driven with and without application of embodiments of the present invention. FIG. 2A illustrates an eye diagram of a signal generated by a VCSEL driven without application of embodiments of the present invention. As can be observed from the eye diagram, the ripples are relatively large and the eye size is not optimized. FIG. 2B illustrates an eye diagram of signals generated by a VCSEL driven with application of embodiments of the present invention. As can be observed from the eye diagram, the ripples are much smaller and the eye size are much bigger, resulting in more accurate and efficient transmission of information. The eye size in FIG. 2A suffers from eye-compression compared to the eye size in FIG. 2B.

FIG. 3 illustrates a block diagram of an example traditional feedforward equalizer 300. The example traditional feedforward equalizer 300 is a 3-tap equalizer for PAM-4 signals. Multiplexers 302A and 302B are N to 1 multiplexers configured to multiplex a plurality of least significant bits and most significant bits of an input signal to a desired transmission symbol rate. The type of multiplexer used may be dependent on a desired subsampling ratio at which an input signal is sampled. The number of "N" on the multiplexer 302A and 302B may be equal to any desired subsampling ratio. For example, if the desired subsampling ratio is 4 to 1, the number of "N" may be equal to 4; so the multiplexers 302A and 302B may be 4 to 1 multiplexers.

After the multiplexers 302A and 302B multiplex a plurality of least significant bits and most significant bits of an input signal to a desired transmission symbol rate, the multiplexed set of least significant bits and most significant bits are fed into and equalized by flip flops 304A-304D and variable gain amplifiers 306A-306F. Each of the flip flops 304A-304D are configured to delay the multiplexed set of least significant bits and most significant bits by one clock cycle. Other electronic circuits that are capable of storing an input for at least one clock cycle may be utilized as flip flops 304A-304D. Because the flip flops 304A-304D delay the outputs of the multiplexers 302A and 302B by one clock cycle, three total most significant bits (most significant bits of precursor, main, and post cursor) and three total least significant bits (least significant bits of precursor, main, and post cursor) are fed into the variable gain amplifiers 306A-306F simultaneously. Each of the variable gain amplifiers 306A-306F can apply a positive or negative gain.

The variable gain amplifiers 306A to 306F may be configured to amplify the gains of the multiplexed set of least significant bits and most significant bits by a pre-determined set of gain factors. One example way of configuring the variable gain amplifiers 306A to 306F is to set the gain factor for all of the most significant bits to be twice as large as their corresponding least significant bits. A summer circuit 307 is configured to add all the outputs signals of the variable gain amplifiers 306A-306F to generate an output signal 310. The output signal encodes a plurality of bits in a number of amplitude levels. The output signal 310 may be fed into an output driver circuit. In some embodiments, the output driver circuit may be a VCSEL driver circuit, EML driver circuit, DML driver circuit, or other laser driver circuits. In some embodiments, the output driver circuit may be configured to drive a non-linear optical laser. In some embodiments, the output driver circuit may be configured to drive a communication channel electrical interface. In some embodiments, the output driver circuit may be configured to drive a modulator.

The traditional feedforward equalizer 300 illustrated in FIG. 3 cannot individually equalize each transition of a PAM-4 signal because it cannot differentiate between each transition. The traditional feedforward equalizer 300 cannot apply different gain amplification based on the value of the input signal. Therefore, for a communication system that relies on the traditional feedforward equalizer 300, the issues described above in connection with FIG. 1 and FIG. 2A will occur.

FIG. 4 illustrates a transition based feedforward equalizer 400 that utilizes lookup table circuits according to example embodiments of the present invention. Embodiments of the transition based feedforward equalizer 400 can individually equalize each transition of a pulse amplitude modulation signal such as a PAM-4 signal. In some embodiments, the transition based feedforward equalizer 400 comprises a plurality of lookup table circuits 402A to 402N, a plurality of multiplexers 404A to 404K, and a plurality of variable gain amplifiers 406A to 406K. In some embodiments, the transition based feedforward equalizer 400 may receive a PAM-4 signal as an input. The multiplexers 404A to 404K may be N to 1 multiplexers, where the number N is equal to the total number of lookup table circuits 402A to 402N. In some embodiments, the input signal of the transition based feedforward equalizer 400 may only consist of a plurality of fixed taps of a signal. In some embodiments, the input signal of the transition based feedforward equalizer 400 may consist of a plurality of fixed taps of a signal and a plurality of floating taps of a signal. The plurality of floating taps may be side taps of a signal. One example number of fixed taps is 3 taps and one example number of floating taps is 8 taps. In some embodiments, the input signal may consist of only a plurality of fixed taps of a signal. In some embodiments, the input signal represents a low-rate flows portion of a full-rate signal. In some embodiments, the low-rate flows portion may be obtained by subsampling or sampling a full-rate signal. In some embodiments, the low-rate flows portion may be obtained by directly generating a low-rate signal.

In some embodiments, the number of N may depend on the subsampling ratio desired. For example, if the desired subsampling ratio is 2, N would equal to 2. The lookup table circuits 402A to 402N may be configured to receive the input signal. Then the lookup table circuits 402A to 402N may be configured to generate an output signal with K bit values for each of the input states in the input signal. Therefore, the lookup table circuits 402A to 402N may generate the K bits as outputs. The lookup table circuits 402A to 402N may operate by generating an output signal with K bit values based on the input signal and a plurality of pre-defined configurations. Specific configurations of the lookup table circuits 402A to 402N may be adjusted based on the desired equalization.

In some embodiments, the lookup table circuits 402A to 402N may each be a plurality of lookup table circuits 500 illustrated in FIG. 5. If the lookup table circuits 402A to 402N are a plurality of lookup table circuits 500 as illustrated in FIG. 5, the transition based feedforward equalizer 400 is a floating tap transition based feedforward equalizer that enables a reconfigurable reflection canceling method. Additionally or alternatively, the lookup table circuits 402A to 402N may be traditional lookup table circuits.

In some embodiments, once the lookup table circuits 402A to 402N generate the output signal with K bits, each of the K bits in the output signal are fed into the multiplexers 404A to 404K to be multiplexed to a final symbol rate of an output signal. Each of the multiplexers 404A to 404K may be an N to 1 multiplexer, where the number of N is equal to the total number of lookup table circuits. In some embodiments, after each of the K bits in the output signal are multiplexed by the multiplexers 404A to 404K, each of the K bits in the output signal may be fed into each of the variable gain amplifiers 406A to 406K. The variable gain amplifiers 406A to 406K effectively serves as a digital to analog converter.

Each of the K bits in the output signal may be fed into each of the variable gain amplifiers 406A to 406K. The multiplexers 404A to 404K generates a plurality of multiplexer outputs by multiplexing the each of the K bits in the output signal of the lookup table circuits. In some embodiments, the plurality of multiplexer outputs of the multiplexers 404A to 404K correspond with the each of the K bits.

Each of the variable gain amplifiers 406A to 406K may be configured to amplify the gain of the plurality of multiplexer outputs by a pre-determined set of gain factors. In some embodiments, each of the variable gain amplifiers 406A to 406K may apply a different gain factor to the plurality of multiplexer outputs. Specific values of the gain factors may be pre-defined based on desired equalization. Therefore, embodiments of the transition based feedforward equalizer 400 may independently adjust gain factors of each of the K bits in the output. Accordingly, the transition based feedforward equalizer 400 addresses the issue illustrated in FIG. 1 by equalizing each transition separately.

After the variable gain amplifiers 406A to 406K apply gain factors to each of the K bits in the output signal of the multiplexers, the variable gain amplifiers 406A to 406K generate a plurality of variable gain amplifiers output that may be fed into a summer circuit 408. The summer circuit 408 may add the set of variable gain amplifiers outputs to generate an equalized output signal 410. In some embodiments, the equalized output signal 410 may be fed into an output driver circuit.

FIG. 5 illustrates a block diagram of a lookup table circuit 500, where the fixed and floating taps of an input signal are processed separately according to example embodiments of the present invention.

The transition based feedforward equalizer 400 can be used for reflection cancellation if it is configured to equalize a plurality of floating taps and a plurality of fixed taps of an input signal. However, if the transition based feedforward equalizer 400 is implemented with a traditional lookup table circuit, for an M-tap equalizer for a PAM-4 signal, a traditional lookup table circuit with $2^{2M}$ entries is required. Therefore, if the transition based feedforward equalizers 400 is used to equalize both the floating taps and the fixed taps for a PAM-4 signal with 8 symbols floating taps and 3 symbols fixed taps, the total number of entries required for a traditional lookup table circuit used as lookup table circuit 402A would scale to an extremely large number. This would significantly limit the operational efficiency of a single lookup table circuit because a lookup table circuit of an extremely size comprises complex operations that need to be executed sequentially. Lookup table circuits with an extremely large number of entries occupy more space, consume more power, and firmware implemented on the receiver associated with the feedforward equalizer needs to conduct more calculations. Therefore, the operation efficiency of the receiver system would be significantly limited if one single traditional lookup table circuit of large size is used as lookup table circuit 402A.

By processing the fixed and floating taps separately, the lookup table circuit 500 is able to reduce the number of entries compared to a traditional lookup table circuit. For an M-tap equalizer that processes fixed taps and floating taps of a signal, often times floating taps are insignificant. Therefore, it is possible to reduce the size of the lookup table circuits by using separate lookup table circuits to process the floating taps and the fixed taps of an input signal separately and process only a sample of the floating taps. As illustrated in FIG. 5, in some embodiments, the lookup table circuit 500 takes an input signal that consists of a plurality of fixed taps 502B and a plurality of floating taps 502A. One example of the fixed taps 502B consists of 3 symbols and each symbol has a least significant bit and a most significant bit if the input signal for the lookup table circuit 500 is a PAM-4 signal. Configurations of the fixed taps 502B can be changed based on the amplitude modulation level of the input signal and the desired number of fixed taps. One example of the fixed taps 502B consists of 3 symbols, and each symbol has a least significant bit and a most significant bit if the input signal for the lookup table circuit 500 is a PAM-4 signal. Configurations of the floating taps 502A are dependent on the amplitude modulation level of the input signal and the desired number of fixed taps.

As illustrated in FIG. 5, the fixed taps 502B are fed into a fixed tap lookup table circuit 504B. The fixed tap lookup table circuit 504B is a lookup table circuit configured to process the fixed taps 502B to generate an output. The fixed tap lookup table circuit 504B may be a traditional lookup table circuit. The output of the fixed tap lookup table circuit 504B may be fed into summer circuit 508. The floating taps 502A may be sampled using a plurality of selector circuits 506 then fed into a floating tap lookup table circuit 504A. The floating tap lookup table circuit 504A may be a lookup table circuit configured to process the floating taps 502A to generate an output. The floating tap lookup table circuit 504A may be a traditional lookup table circuit. The specific number of selector circuits used in the selector circuits 506 may be independent from the number of symbols and bits in the fixed taps. The output of the floating tap lookup table circuit 504A may be fed into summer circuit 508. The summer circuit 508 may be configured to generate an equalized output signal based on the output from the floating tap lookup table circuit 504A and the output of the fixed tap lookup table circuit 504B. The equalized output signal of summer circuit 508 may be fed into a digital to analog converter ("DAC") to generate a signal that may be fed into an output driver circuit. In some embodiments, the equalized output signal of the summer circuit 508 may be directly fed into an output driver circuit.

FIG. 6 illustrates a block diagram of a digital approach to implement a transition based feedforward equalizer with lookup table circuits 500 according to example embodiments of the present invention. In some embodiments, an input signal is sampled at three different temporal points using sample and hold circuits 604A to 604F. A different number of temporal points and sample and hold circuits may be used. The least significant bits and the most significant bits may be sampled separately. For example, as illustrated in FIG. 6, at the first temporal point the sample and hold circuit 604A samples and holds the most significant bit and the sample and hold circuit 604B samples and holds the least significant bit. At the second temporal point the sample and hold circuit 604C samples and holds the most significant bit and the sample and hold circuit 604D samples and holds the least significant bit. At the third temporal point the sample and hold circuit 604E samples and holds the most significant bit and the sample and hold circuit 604F samples and holds the least significant bit. The temporal points are separate based on operation of time adjustment circuits 602A and 602B which hold the input signal for a pre-defined amount of time. In some embodiments, the time adjustment circuits 602A and 602B may be implemented using one or a plurality of flip flops.

After the sample and hold circuits 604A to 604F sample the input signal, outputs of the sample and hold circuits 604A to 604F may be fed into a look up table circuit 606 to generate an equalized output signal comprising a plurality (K) of bits. In some embodiments, the lookup table circuit circuits 606 may be structured similar to the lookup table circuits illustrated in FIGS. 4 and 5.

After the lookup table circuits 606 generates the equalized output signal, the equalized output signal may be fed into a digital to analog converter 608 to generate an analog equalized output signal 610 based on the equalized output signal. The output signal 610 may be fed into an output driver circuit.

FIG. 7 is a flowchart illustrating an example method of operation of a transition based feedforward equalizer with lookup table circuits according to example embodiments of the present invention. It will be understood that each block of the flowcharts, and combinations of blocks in the flowcharts, may be implemented by various means. In some example embodiments, certain ones of the operations herein may be modified or further amplified as described below. Moreover, in some embodiments additional optional operations may also be included. It should be appreciated that each of the modifications, optional additions, or amplifications described herein may be included with the operations herein either alone or in combination with any others among the features described herein. The operation illustrated in FIG. 6 may be performed by one of the transition based feedforward equalizers illustrated in FIGS. 4 to 6.

In some embodiments, at operation 702, the transition based feedforward equalizer receives an input signal, wherein the input signal encodes information in a plurality of bits. In some embodiments, the input signal represents a low-rate flows portion of a full-rate signal. In some embodiments, the input signal consists of fixed taps of a signal. In some embodiments, the input signal consists of fixed taps and floating taps of a signal. In some embodiments, the input signal is a PAM-4 signal.

In some embodiments, at operation 704, the transition based feedforward equalizer converts the input signal to an equalized output signal using a plurality of lookup table circuits, wherein the equalized output signal encodes a plurality of symbols in a number of amplitude levels. In some embodiments, the lookup table circuits may be similar to the lookup table circuit illustrated in FIG. 5. Generally, the lookup table circuits are configured to overcome an eye-compression and an eye-closure of an eye diagram of an output generated by a laser source as illustrated in FIGS. 2A and 2B. Additionally, the effective number of taps can be increased with one or more floating LUTs, e.g. to compensate reflections. In some embodiments, converting the input signal to the equalized output signal may further comprise using a plurality of multiplexers to multiplex a plurality of outputs of the lookup table circuit. In some embodiments, converting the input signal to the equalized output signal may further comprise using a plurality of variable gain amplifiers to amplify a plurality of outputs of the multiplexers similar to the illustrated equalizer in FIG. 4. In some embodiments, the equalized output signal may be a pulse amplitude modulation signal encoding the plurality of symbols in four amplitude levels. In some embodiments, the plurality of bits in the input signal represent a plurality of transition levels of a pulse amplitude modulation signal such as level 1 to levels 2, 3, or 4 in a PAM-4 signal. In some embodiments, bits corresponding to different transition levels of the plurality of transition levels are converted independently.

In some embodiments, the plurality of bits in the input signal may comprise a plurality of fixed tap bits and a plurality of floating tap bits. In some embodiments, converting the input signal to the equalized output signal may also involve using a plurality of selector circuits to select a plurality of bits from the floating tap bits based on a pre-defined configuration; using a plurality of floating tap bits processing lookup table circuits to convert the selected floating tap bits; and using a plurality of fixed tap bits processing lookup table circuits to convert the plurality of fixed tap bits. In some embodiments, the plurality of bits in the input signal comprise only a plurality of fixed tap bits.

In some embodiments, at optional operation 706, the transition based feedforward equalizer converts the equalized output signal to an analog equalized output signal. In some embodiments, operation 706 may be performed by a DAC that is separate from the transition based feedforward equalizer. In some embodiments, operation 706 may be performed by a DAC that is part of the transition based feedforward equalizer. For example, the variable gain amplifiers 406A to 406K illustrated in the transition based feedforward equalizer in FIG. 4 effectively function as a DAC to convert the equalized output signal to an analog equalized output signal.

In some embodiments, at operation 708, the transition based feedforward equalizer feeds the equalized output signal to an output driver circuit. The output driver circuit may be a VCSEL driver circuit, EML driver circuit, DML driver circuit, or other types of laser driver circuits. In some embodiments, the output driver circuit may be a non-linear optical laser driver circuit. In some embodiments, the output driver circuit may be configured to drive a communication channel electrical interface. In some embodiments, the output driver circuit may be configured to drive a modulator.

Many modifications and other embodiments of the present inventions set forth herein will come to mind to one skilled in the art to which these inventions pertain having the benefit of the teachings presented in the foregoing descriptions and the associated drawings. Therefore, it is to be understood that the present inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The invention claimed is:

1. A feedforward equalization method for equalizing input signals for communication systems, comprising:
   receiving an input signal, wherein the input signal encodes a plurality of bits in a number of amplitude levels, and wherein the plurality of bits in the input signal comprises a plurality of fixed tap bits and a plurality of floating tap bits;
   using a plurality of selector circuits in a plurality of lookup table circuits to select a plurality of bits from the plurality of floating tap bits;
   using a plurality of floating tap bits processing lookup table circuits in the plurality of lookup table circuits to convert the plurality of selected floating tap bits;
   using a plurality of fixed tap bits processing lookup table circuits in the plurality of lookup table circuits to convert the plurality of fixed tap bits;
   using a plurality of summer circuits in the plurality of lookup table circuits to add the plurality of converted selected floating tap bits and the plurality of converted fixed tap bits to generate a plurality of outputs of the lookup table circuits;
   using a plurality of multiplexers to multiplex the plurality of outputs of the lookup table circuits;
   using a plurality of variable gain amplifiers to amplify a plurality of outputs of the multiplexers; and
   feeding a plurality of outputs of the multiplexers to an output driver circuit.

2. The method of claim 1, wherein the equalized output signal is a pulse amplitude modulation signal encoding the plurality of symbols in four amplitude levels.

3. The method of claim 1, wherein the input signal is generated by subsampling a full-rate signal.

4. The method of claim 3, wherein the input signal represents a low-rate flows portion of the full-rate signal.

5. The method of claim 1, wherein the plurality of bits in the input signal represent a plurality of transition levels of a pulse amplitude modulation signal, and wherein bits in the plurality of bits in the input signal corresponding to different transition levels of the plurality of transition levels are converted independently.

6. The method of claim 1, wherein an output associated with the output driver circuit is a vertical cavity surface emitting laser.

7. The method of claim 1, wherein the lookup table circuits are configured to overcome an eye-compression and an eye-closure of an eye diagram of an output generated by an output source associated with the output driver circuit.

8. A transmitter-side feedforward equalizer used in communication systems, wherein the transmitter-side equalizer is configured to:
   receive an input signal, wherein the input signal encodes a plurality of bits in a number of amplitude levels, and wherein the plurality of bits in the input signal comprises a plurality of fixed tap bits and a plurality of floating tap bits;
   use a plurality of selector circuits in a plurality of lookup table circuits to select a plurality of bits from the plurality of floating tap bits;
   use a plurality of floating tap bits processing lookup table circuits in the plurality of lookup table circuits to convert the plurality of selected floating tap bits;
   use a plurality of fixed tap bits processing lookup table circuits in the plurality of lookup table circuits to convert the plurality of fixed tap bits;
   use a plurality of summer circuits in the plurality of lookup table circuits to add the plurality of converted selected floating tap bits and the plurality of converted fixed tap bits to generate a plurality of outputs of the lookup table circuits;
   use a plurality of multiplexers to multiplex the plurality of outputs of the lookup table circuits;
   use a plurality of variable gain amplifiers to amplify a plurality of outputs of the multiplexers; and
   feed a plurality of outputs of the multiplexers to an output driver circuit.

9. The apparatus of claim 8, wherein the equalized output signal is a pulse amplitude modulation signal encoding the plurality of symbols in four amplitude levels.

10. The apparatus of claim 8, wherein the input signal is generated by subsampling a full-rate signal.

11. The apparatus of claim 10, wherein the input signal represents a low-rate flows portion of the full-rate signal.

12. The apparatus of claim 8, wherein the plurality of bits in the input signal represent a plurality of transition levels of a pulse amplitude modulation signal, and wherein bits in the plurality of bits in the input signal corresponding to different transition levels of the plurality of transition levels are converted independently.

13. The apparatus of claim 8, wherein an output associated with the output driver circuit is a vertical cavity surface emitting laser.

14. The apparatus of claim 8, wherein the lookup table circuits are configured to overcome an eye-compression and an eye-closure of an eye diagram of an output generated by an output source associated with the output driver circuit.

* * * * *